United States Patent
Sawada (10) Patent No.: US 8,717,620 B2
(45) Date of Patent: May 6, 2014

(54) PRINT SERVER AND PRINT CONTROL METHOD

(75) Inventor: Takayuki Sawada, Shizuoka-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 383 days.

(21) Appl. No.: 13/156,459

(22) Filed: Jun. 9, 2011

(65) Prior Publication Data

US 2011/0304866 A1  Dec. 15, 2011

Related U.S. Application Data

(60) Provisional application No. 61/353,294, filed on Jun. 10, 2010.

(51) Int. Cl.
*H04N 1/60* (2006.01)
*G06F 3/12* (2006.01)

(52) U.S. Cl.
USPC .......................... 358/1.9; 358/1.13; 358/1.15

(58) Field of Classification Search
USPC ......... 358/1.9, 1.13, 1.15; 399/45; 347/14, 19
See application file for complete search history.

(56) References Cited

U.S. PATENT DOCUMENTS 7,355,745 B2 *  4/2008  Hudson et al. .................. 358/1.9
7,728,992 B2 *  6/2010  Yamamoto et al. .......... 358/1.13

FOREIGN PATENT DOCUMENTS

JP  2004-048815  2/2004

* cited by examiner

*Primary Examiner* — Charlotte M Baker
(74) *Attorney, Agent, or Firm* — Amin, Turocy & Watson, LLP (57) ABSTRACT

According to one embodiment, a print server includes an acquisition portion, an analysis portion, a selection portion, and a control portion. The acquisition portion acquires target color gamut information from print data and acquires printer color gamut information from each of a plurality of printers. The analysis portion analyzes the target color gamut information and the printer color gamut information of each printer. The selection portion selects one or more printers from among the plurality of printers on the basis of the analysis result. The control portion instructs the selected printer to print the print data.

18 Claims, 4 Drawing Sheets

PRINT SERVER AND PRINT CONTROL METHOD

CROSS-REFERENCE TO RELATED APPLICATIONS

This application is based upon and claims the benefit of priority from U.S. Provisional Application No. 61/353,294, filed on Jun. 10, 2010; the entire contents of which are incorporated herein by reference.

FIELD

Embodiments described herein relate generally to a print server and a print control method.

BACKGROUND

In recent years, network printers have become remarkably widespread. Network printers receive print data from a client computer via a network such as a LAN and print an image based on the received print data.

Furthermore, a technique using a plurality of network printers to reduce a print time is known. For example, as a method of reducing a print time when printing many copies of documents, a technique referred to as tandem printing is known. According to the tandem printing technique, a print server divides copies of print documents between a plurality of network printers, so that each of the network printers prints the divided copies of print documents.

DETAILED DESCRIPTION

In general, according to one embodiment, a print server includes an acquisition portion, an analysis portion, a selection portion, and a control portion. The acquisition portion acquires target color gamut information from print data and acquires printer color gamut information from each of a plurality of printers. The analysis portion analyzes the target color gamut information and printer color gamut information of each printer. The selection portion selects one or more printers from among the plurality of printers on the basis of the analysis result. The control portion instructs the selected printer to print the print data.

Figure 1:
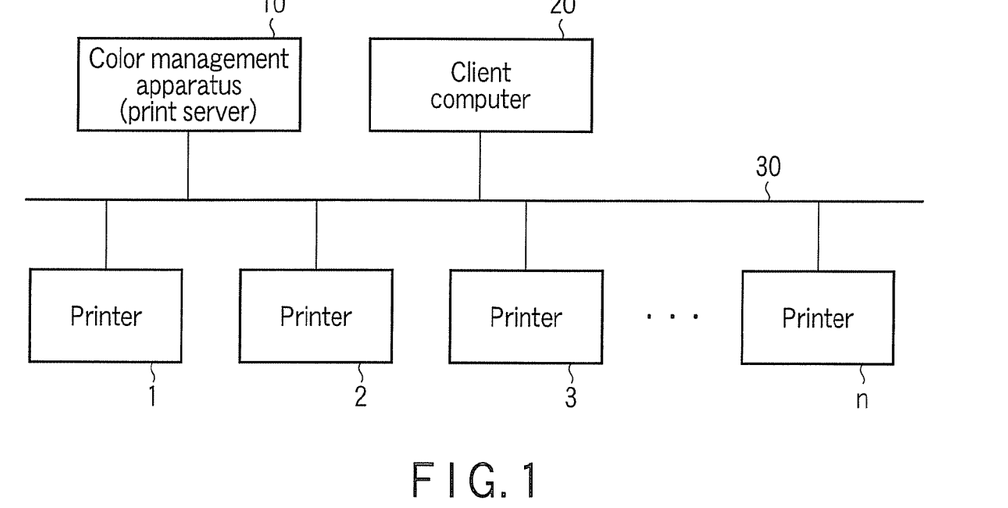
FIG. 1 is a diagram showing an example of the schematic configuration of an image processing system according to an embodiment.

FIG. 1 is a diagram showing an example of the schematic configuration of an image processing system according to an embodiment. As shown in FIG. 1, the image processing system includes a color management apparatus (print server) 10, a client computer 20, and n printers (plural) 1-n (n: integer, n≥2). The color management apparatus 10 may be constituted of, for example, a computer. The color management apparatus 10, the client computer 20, and the printers 1-n (printer group) are connected to each other via a network 30.

The client computer 20 generates print data such as a print job and transmits the print data to the print server 10. The print server 10 receives (acquires) print performance information from the printers 1-n and receives (acquires) print data which is transmitted from the client computer 20. The print server 10 selects one or more printers from the printers 1-n on the basis of the print performance information from each printer and the print data from the client computer 20, and instructs the selected printer to perform printing based on the print data. The selected printer prints images based on the print data.

For example, the print performance information includes color gamut information (printer color gamut information). In addition, the print data includes color gamut information (target color gamut information). In addition, the print job which is included in the print data includes the designated number of print copies which is designated by a user. The print server 10 analyzes the target color gamut information and the printer color gamut information, and selects one or more printers from the printers 1-n on the basis of the analysis result. Furthermore, the print server 10 assigns the number of print copies to the selected printers on the basis of the designated number of print copies and instructs each selected printer to perform printing based on the print data. Each selected printer prints the assigned number of copies of images on the basis of the print data.

The selection of printers from the printers 1-n (printer group) will be described later in detail.

Figure 2:
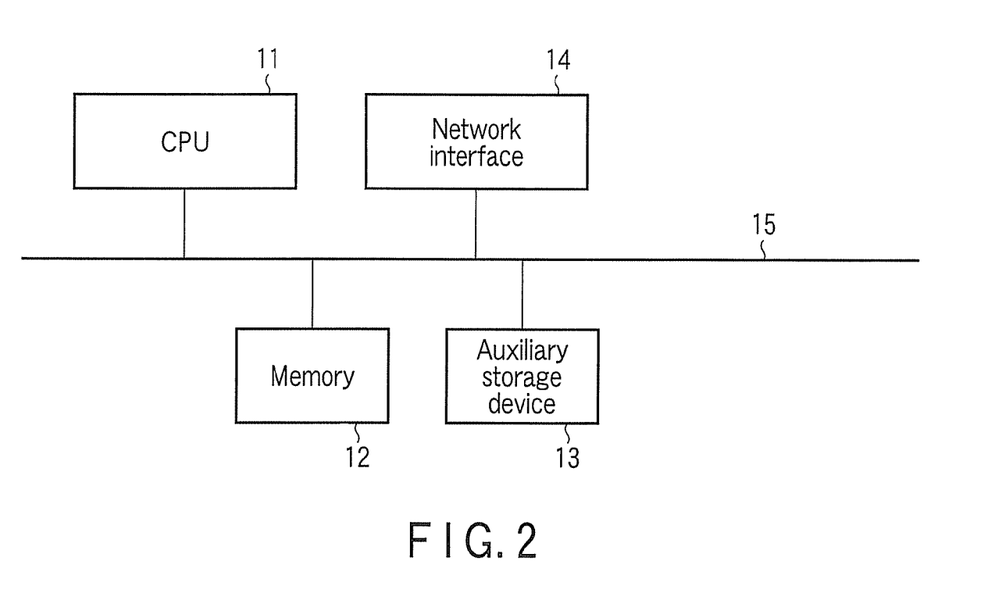
FIG. 2 is a diagram showing an example of the schematic configuration of a print server according to the embodiment.

FIG. 2 is a diagram showing an example of the schematic configuration of the print server according to the embodiment. As shown in FIG. 2, the print server 10 includes a CPU (control portion) 11, a memory 12, an auxiliary storage device 13, and a network interface 14. The CPU (control portion) 11, the memory 12, the auxiliary storage device 13, and the network interface 14 are connected to each other via a data and control signal bus 15. The main agent of the operation of the print server 10 is the CPU 11. The auxiliary storage device 13 is, for example, a hard disk.

Figure 3:
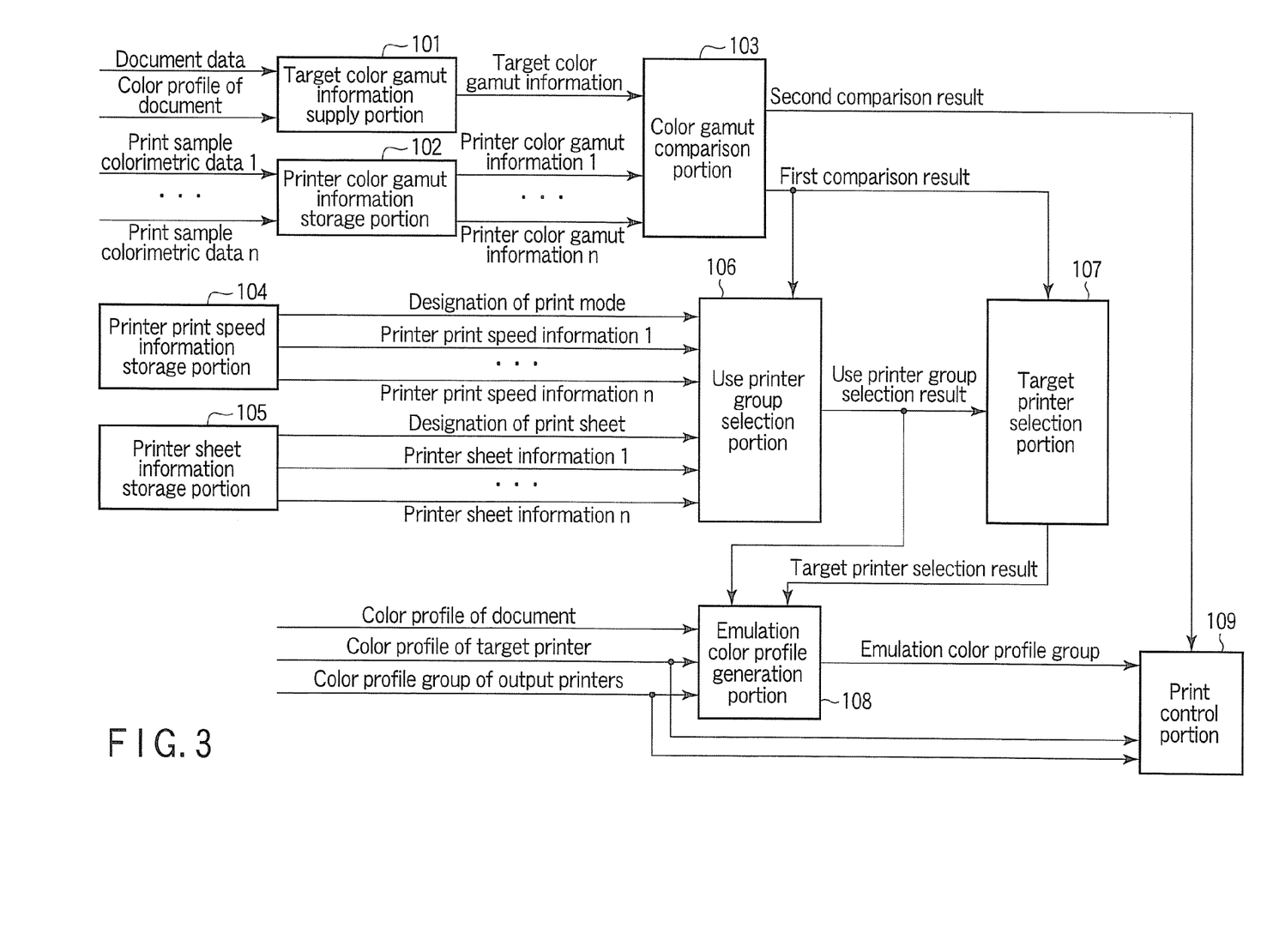
FIG. 3 is a diagram illustrating an example of a color management function of the print server according to the embodiment.

FIG. 3 is a diagram illustrating an example of a color management function of the print server according to the embodiment. The color management function of the print server 10 is realized by a target color gamut information supply portion 101, a printer color gamut information storage portion 102, a color gamut comparison portion 103, a printer print speed information storage portion 104, a printer sheet information storage portion 105, a use printer group selection portion 106, a target printer selection portion 107, an emulation color profile generation portion 108, and a print control portion 109.

For example, the network interface 14 constitutes the target color gamut information supply portion 101. In addition, the auxiliary storage device 13 constitutes the printer color gamut information storage portion 102, the printer print speed information storage portion 104, and the printer sheet information storage portion 105. In addition, the CPU 11 constitutes the color gamut comparison portion 103, the use printer group selection portion 106, the target printer selection portion 107, the emulation color profile generation portion 108, and the print control portion 109. The CPU 11 controls the operations of the portions in order to realize the color management function.

For example, the network interface 14 receives print data from the client computer 20 and outputs the print data to the target color gamut information supply portion 101. The target color gamut information supply portion 101 generates color gamut information (target color gamut information) of a subject document on the basis of subject document data included in the print data and a color profile of this subject document data included in the print data, and outputs the target color gamut information to the color gamut comparison portion 103. Otherwise, the network interface 14 receives color gamut information (target color gamut information) of a subject document from the client computer 20 or the like, and the target color gamut information supply portion 101 outputs the received target color gamut information to the color gamut comparison portion 103.

The network interface 14 also outputs the print data (color profile of subject document data) to the emulation color profile generation portion 108.

In addition, for example, the network interface 14 receives colorimetry data (measurement result of color sample) of color patches which are printed by the printers 1-$n$ in an area such as an office. The printer color gamut information storage portion 102 generates color gamut information (printer color gamut information) of the printers 1-$n$ on the basis of the colorimetry data of the printers 1-$n$, stores the color gamut information (printer color gamut information) of the printers 1-$n$, and outputs the color gamut information (printer color gamut information) of the printers 1-$n$ to the color gamut comparison portion 103. In addition, the network interface 14 receives print performance information from the printers 1-$n$. The printer color gamut information storage portion 102 can also generate color gamut information (printer color gamut information) of the printers 1-$n$ on the basis of the color profiles of the printers 1-$n$ which are included in the print performance information of the printers 1-$n$, store the color gamut information (printer color gamut information) of the printers 1-$n$, and output the color gamut information (printer color gamut information) of the printers 1-$n$ to the color gamut comparison portion 103.

In addition, the network interface 14 outputs the print performance information of the printers 1-$n$ to the emulation color profile generation portion 108.

The color gamut comparison portion 103 analyzes the relation between the target color gamut information and the print color gamut information of the printers 1-$n$. For example, the color gamut comparison portion 103 compares the target color gamut information with the print color gamut information of the printers 1-$n$ and generates first and second comparison results. The color gamut comparison portion 103 supplies the first comparison result to the use printer group selection portion 106 and the print control portion 109. The color gamut comparison portion 103 supplies the second comparison result to the target printer selection portion 107.

The first comparison result is information showing the result of evaluation about whether or not the print color gamut information of the printers 1-$n$ is included in the target color gamut information. That is, the first comparison result includes the result of evaluation about whether or not the print color gamut information of a printer 1 includes the target color gamut information, the result of evaluation about whether or not the print color gamut information of a printer 2 includes the target color gamut information, the result of evaluation about whether or not the print color gamut information of a printer 3 includes the target color gamut information, and the like.

The second comparison result is information showing color distribution quantities outside the color gamut that the print color gamut information of the printers 1-$n$ represents and inside the color gamut that the target color gamut information represents. That is, the second comparison result includes color distribution quantities outside the color gamut (color gamut which cannot be reproduced by the printer 1) that the print color gamut information of the printer 1 represents and inside the color gamut (inside the color gamut that the print data demands) that the target color gamut information represents, color distribution quantities outside the color gamut that the print color gamut information of the printer 2 represents and inside the color gamut that the target color gamut information represents, color distribution quantities outside the color gamut that the print color gamut information of the printer 3 represents and inside the color gamut that the target color gamut information represents, and the like. In other words, the second comparison result is information showing nonpermissive printer color gamut components of the printers among the target color gamut components that the target color gamut information represents.

In addition, for example, the network interface 14 receives print performance information from the printers 1-$n$. The printer print speed information storage portion 104 stores print speed information of the printers 1-$n$ which is included in the print performance information from the printers 1-$n$. In addition, the printer print speed information storage portion 104 outputs the print speed information of the printers 1-$n$ to the printer group selection portion.

In addition, the printer sheet information storage portion 105 stores information (sheet information) about the sheet type, such as sheet quality, size, and thickness, which can be currently used in the printers 1-$n$, which is included in the print performance information from the printers 1-$n$. The printer sheet information storage portion 105 outputs the sheet information of the printers 1-$n$ to the printer group selection portion.

For example, the use printer group selection portion 106 selects a plurality of (one or more) printers to be used in tandem printing from among the printer group (printers 1-$n$) on the basis of at least one of the print speed information of the printers 1-$n$, sheet information of the printers 1-$n$, print mode designation, print sheet designation, and the first comparison result. Furthermore, the use printer group selection portion 106 outputs the use printer group selection result to the target printer selection portion 107.

In addition, the use printer group selection portion 106 can select one printer from among the printer group (printers 1-$n$) when judging that it is difficult to perform tandem printing on the basis of at least one of the print speed information of the printers 1-$n$, sheet information of the printers 1-$n$, print mode designation, print sheet designation, and the first comparison result, and output the selection result as the use printer selection result.

The target printer selection portion 107 selects a target printer for color emulation to be described later from among the two or more printers that the use printer group selection result shows on the basis of the second comparison result and the use printer group selection result. Furthermore, the target printer selection portion 107 outputs the target printer selection result to the emulation color profile generation portion 108.

The emulation color profile generation portion 108 receives the color profile of subject document data from the network interface 14. Furthermore, the emulation color profile generation portion 108 receives the print performance information (color profile) of a target printer which is included in the print performance information of the printers 1-$n$ from the network interface 14 and the print performance information (color profile) of the use printer group excluding the target printer.

The emulation color profile generation portion 108 generates an emulation color profile group for output printers for emulating the color reproduction of a target printer on the basis of the color profile of a subject document, the color profile of the target printer, and the color profile group of the output printers. The emulation color profile generation portion 108 outputs the emulation color profile group to the print control portion 109.

Figure 5:
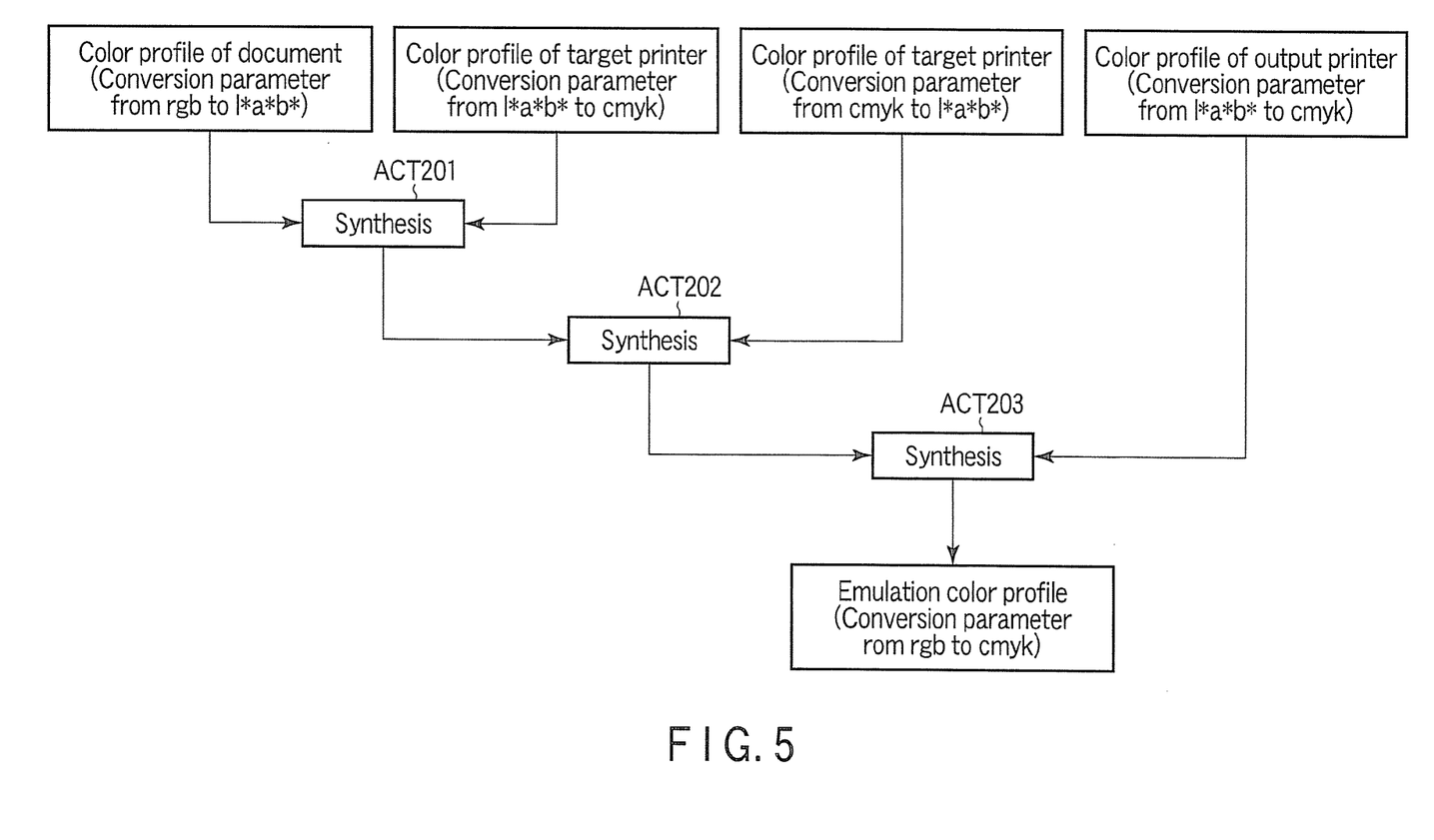
FIG. 5 is a diagram showing an example of the concept of an emulation color profile and an emulation color profile generation process.

FIG. 5 is a diagram showing an example of the concept of an emulation color profile and an emulation color profile generation process. The color emulation is color processing for making a result A (color reproduction A) which is obtained by printing a document D with a printer A equal to a result B (color reproduction B) which is obtained by printing the document D with a printer B. The printer A corresponds to an output printer and the printer B corresponds to a target printer.

In addition, a color processing parameter (color correction parameter) for the color emulation is referred to as a color emulation profile for allowing the printer A to color-emulate the printer B. The color emulation profile is obtained by sequentially synthesizing (ACT 201, ACT 202, ACT 203) the color definition profile of the document (color profile of the document (for example, conversion parameter from RGB to L*a*b*), the conversion parameter from L*a*b* to CMYK of the color profile of the target printer, the conversion parameter from CMYK to L*a*b* of the color profile of the target printer, and the color profile of the output printer (conversion parameter from L*a*b* to CMYK). That is, the color emulation profile is the conversion parameter from RGB to CMYK.

The print control portion 109 selects and supplies a color profile to be actually used to a use printer to be used in tandem printing. That is, the print control portion 109 supplies a color profile for a target printer to the target printer and supplies to each output printer a (original) color profile of each output printer or an emulation color profile which is generated for each output printer. A parameter for colorimetric color reproduction of the target printer is applied to the color profile for the target printer. Similarly, a parameter for colorimetric color reproduction of each output printer is applied to the (original) color profile of each output printer.

Figure 4:
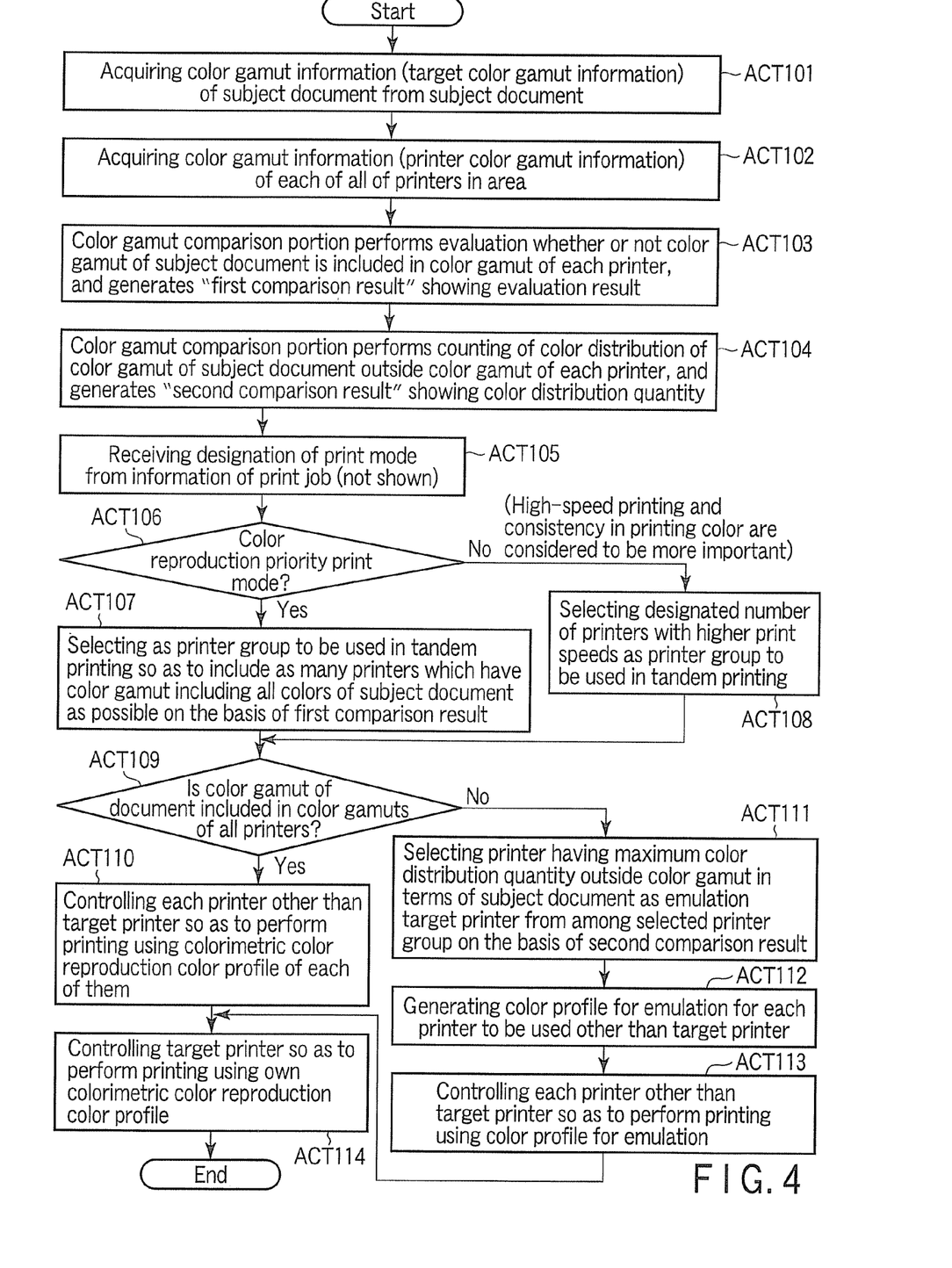
FIG. 4 is a flowchart illustrating an example of the color management function by the print server according to the embodiment.

FIG. 4 is a flowchart illustrating an example of the color management function by the print server according to the embodiment.

For example, the network interface 14 of the print server 10 receives (acquires) print data transmitted from the client computer 20, and the target color gamut information supply portion 101 acquires the color gamut information (target color gamut information) of a document on the basis of the document data and the color profile included in the print data (ACT 101). Otherwise, the network interface 14 receives the color gamut information (target color gamut information) of the document from the client computer 20 or the like (ACT 101).

In addition, the network interface 14 receives colorimetric data of color patches which are printed by the printers 1-n, and the printer color gamut information storage portion 102 stores the color gamut information (printer color gamut information) of the printers 1-n which is generated from the colorimetric data of the printers 1-n (ACT 102). Otherwise, the network interface 14 receives print performance information from the printers 1-n, and the printer color gamut information storage portion 102 stores the color gamut information (printer color gamut information) of the printers 1-n which is generated from the color profiles of the printers 1-n included in the printer performance information of the printers 1-n (ACT 102).

In addition, the color gamut comparison portion 103 analyzes target color gamut information and the printer color gamut information of the printers 1-n. For example, the color gamut comparison portion 103 compares the target color gamut information with the printer color gamut information and generates first and second comparison results (ACT 103, ACT 104). The first and second comparison results are as already described above.

In addition, the use printer group selection portion 106 receives a print mode designation from the information of a print job which is included in the print data (ACT 105). For example, the use printer group selection portion 106 receives a color reproduction priority mode (first mode) or a high-speed print mode (second mode). The color reproduction priority mode is a mode to place a priority on the color reproduction and is used in printing of print data such as design. The high-speed print mode is a mode for balancing the high-speed printing and the consistency in color reproduction.

First, a process when receiving the color reproduction priority mode will be described.

When the use printer group selection portion 106 receives the color reproduction priority mode (ACT 106, YES), the use printer group selection portion 106 selects a plurality of (one or more) printers for use in tandem printing from among the printer group (printers 1-n) on the basis of the first comparison result, print speed information of the printers 1-n, sheet information of the printers 1-n, and the like (ACT 107). For example, the use printer group selection portion 106 determines the number of printers to be used in tandem printing from the designated number of print copies included in the print data and selects the above determined number of printers which have printer color gamut information including or close to target color gamut information. In this case, printers including the target color gamut information are preferentially selected. However, when the determined number is not satisfied, the remaining number of printers is selected in descending order of the size of the printer color gamut information. In addition, when judging that it is difficult to perform tandem printing, the use printer group selection portion 106 can select one printer from among the printer group (printers 1-n) and can also output the selection result as the use printer selection result. In addition, the number of printers to be used in tandem printing may be designated by the print data based on a user's instruction.

When the color gamuts of all the printers selected by the use printer group selection portion 106 in ACT 107 include the color gamut of the document (ACT 109, YES), the print control portion 109 issues an instruction to process the print data on the basis of the colorimetric color reproduction color profile of each of the printers 1-n (ACT 110) (ACT 114). In response to the instruction, the printer 1 executes the printing based on the print data on the basis of the colorimetric color reproduction color profile of the printer 1, the printer 2 executes the printing based on the print data on the basis of the colorimetric color reproduction color profile of the printer 2, and a printer n executes the printing based on the print data on the basis of the colorimetric color reproduction color profile of the printer n.

In addition, when the color gamuts of some of the printers selected by the use printer group selection portion 106 in ACT 107 do not include the color gamut of the document (ACT 109, NO), the target printer selection portion 107 selects an emulation target printer from among some printers of which the color gamuts do not include the color gamut of the document (ACT 111). For example, the target printer selection portion 107 selects as an emulation target printer a printer (printer having a narrowest color reproduction range with respect to a target color gamut) of which the color gamut distribution quantity outside the target color gamut is the greatest.

That is, the color gamut comparison portion 103 compares the target color gamut information with the printer color gamut information of the printers 1-n and detects the nonpermissive printer color gamuts of the printers 1-n among the target color gamuts that the target color gamut information represents. In response to the detection, the use printer group selection portion 106 selects an emulation target printer having the maximum nonpermissive printer color gamut and non-emulation target printers having a nonpermissive printer color gamut other than the maximum nonpermissive printer color gamut among the printers 1-n.

The emulation color profile generation portion 108 generates profiles for color emulation (color correction parameters) for the selected printers other than the emulation target printer (ACT 112).

The print control portion 109 issues an instruction to process the print data on the basis of the profiles for color emulation for the selected printers other than the emulation target printer (ACT 113). In response to the instruction, each selected printer executes the printing based on the print data on the basis of the profile for color emulation for each selected printer.

Furthermore, the print control portion 109 issues an instruction to process the print data on the basis of the colorimetric color reproduction color profile of the target printer (ACT 114).

Next, a process when receiving the high-speed print mode will be described.

When the use printer group selection portion 106 receives the high-speed print mode (ACT 106, NO), first, the use printer group selection portion 106 determines the number of printers to be used in tandem printing from the designated number of print copies included in the print data as in the case of the color reproduction priority mode. In this case, the number of printers may be designated by the print data based on a user's printing instruction. The use printer group selection portion 106 selects the determined number of printers in descending order of the print speed from among the printer group (printers 1-n). Otherwise, the use printer group selection portion 106 may select the determined number of printers (printers satisfying a predetermined printing condition) which have a print speed higher than a reference print speed and which can execute the printing based on the designated sheet which is included in the print data from among the printer group (printers 1-n).

The use printer group selection portion 106 preferentially selects printers including the target color gamut information from among the printers having a high print speed.

When the color gamut of the document is included in the color gamuts of all the printers selected in ACT 108 (ACT 109, YES), the print control portion 109 issues an instruction to process the print data on the basis of the colorimetric color reproduction color profiles of the selected printers (ACT 110) (ACT 114).

When the color gamuts of some of the printers selected in ACT 108 do not include the color gamut of the document (ACT 109, NO) among the printers selected in ACT 108, the target printer selection portion 107 selects an emulation target printer from among the some printers (ACT 111). For example, the use printer group selection portion 106 selects a printer of which the color gamut distribution quantity outside the target color gamut is the greatest as an emulation target printer.

The emulation color profile generation portion 108 generates profiles for color emulation for the selected printers other than the emulation target printer (ACT 112).

The print control portion 109 issues an instruction to process the print data on the basis of the profiles for color emulation for the selected printers other than the emulation target printer (ACT 113). In response to the instruction, each selected printer executes the printing based on the print data on the basis of the profile for color emulation for each selected printer.

Furthermore, the print control portion 109 issues an instruction to process the print data on the basis of the colorimetric color reproduction color profile of the target printer (ACT 114).

The print server of this embodiment can execute the following print control.

(1) The print server according to this embodiment controls a plurality of color printers and the like having different color gamuts via a network or the like, and divides and executes the printing between these plurality of printers.

For example, the print server compares printer color gamuts of a plurality of printers on the network with a target color gamut, evaluates whether or not the target color gamut is included in the printer color gamut of each printer, and generates first comparison result information representing the evaluation result. Furthermore, the print server selects a predetermined number of printers having a printer color gamut which includes the target color gamut or is close to the target color gamut information from among the plurality of printers on the network on the basis of the first comparison result information and the like. Furthermore, the print server controls the selected printer and executes the printing by the selected printer.

Accordingly, by using one or more printers on the network, it is possible to obtain printouts of the same quality which are faithful to the print data.

(2) In addition, the print server according to this embodiment selects only a predetermined number of printers with higher print speeds from among a plurality of printers on the network. Otherwise, the print server selects printers having a print speed higher than a reference print speed from among a plurality of printers on the network. Furthermore, the print server controls the selected printers and executes the printing.

Accordingly, by using one or more printers on the network, it is possible to rapidly obtain printouts of the same quality which are faithful to the print data.

(3) In addition, the print server according to this embodiment compares printer color gamuts of a plurality of printers on the network with a target color gamut, counts color distribution quantities outside the printer color gamut of each printer and inside the target color gamut, and generates second comparison result information representing the color distribution quantity counting result. Furthermore, the print server selects a printer having the maximum color distribution quantity as a target printer on the basis of the second comparison result information and the like. Furthermore, the print server generates an emulation color profile for each printer other than the target printer among the printers having a nonzero color distribution quantity. For example, the print server generates an emulation color profile for each printer other than the target printer on the basis of the color characteristic information of each printer other than the target printer, the color characteristic information of the target printer, and the color characteristic information of the target color gamut. The emulation color profile is a profile for carrying out the color reproduction approximated to that of the target printer. The print server prompts each printer other than the target printer to execute the printing on the basis of the emulation color profile for each printer other than the target printer. Furthermore, the print server prompts the target printer to execute the printing on the basis of the colorimetric color reproduction color profile of the target printer.

(4) In addition, the print server according to this embodiment can select the target printer described in the paragraph (3) from among the printers selected on the basis of the high-speed print mode described in the paragraph (2), and can also select a printer other than the target printer among the printers having a nonzero color distribution quantity.

(5) In addition, when the print server according to this embodiment designates the color reproduction priority mode, the original color of the document is reproduced. In addition, when the print server designates the high-speed print mode, the printing can be completed in a short time and color emulation printing according to a printer having the minimum color gamut can be executed. That is, printouts of stabilized color quality can be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A print server comprising:
   an acquisition portion which acquires target color gamut information from print data and acquires printer color gamut information from each of a plurality of printers;
   an analysis portion which analyzes the target color gamut information and the printer color gamut information of each printer;
   a selection portion which selects one or more printers from among the plurality of printers on the basis of the analysis result; and
   a control portion which instructs the selected one or more printers to print the print data,
   wherein the selection portion obtains the number of printers to be used in printing from the print data, and selects the obtained number of printers having a predetermined printer color gamut information in accordance with a color reproduction priority mode from among the plurality of printers.

2. The print server of claim 1,
   wherein when a high-speed print mode is set, the selection portion selects the obtained number of printers in descending order of the print speed from among the plurality of printers.

3. The print server of claim 2,
   wherein the selection portion preferentially selects printers which have the printer color gamut including the target color gamut from among the selected printers.

4. The print server of claim 1,
   wherein when the color reproduction priority mode is set, the selection portion selects the obtained number of printers having the predetermined printer color gamut information which includes a target color gamut or is close to target color gamut information from among the plurality of printers.

5. The print server of claim 4,
   wherein the selection portion further selects printers which can execute the printing based on a designated sheet included in the print data.

6. The print server of claim 1,
   wherein the analysis portion compares the target color gamut information with the predetermined printer color gamut information of each printer and detects a nonpermissive printer color gamut of each printer in a target color gamut that the target color gamut information represents, and
   the selection portion selects a target printer having the maximum nonpermissive printer color gamut and a nontarget printer group excluding the target printer from among the printers selected by the selection portion.

7. The print server of claim 6,
   wherein the control portion generates a color profile for emulation for the nontarget printer on the basis of the target color gamut information, the predetermined printer color gamut information of the target printer, and the predetermined printer color gamut information of the nontarget printer, instructs the target printer to print the print data, and instructs the nontarget printer to print the print data on the basis of the color profile for emulation.

8. The print server of claim 6,
   wherein the control portion instructs the target printer to print the print data on the basis of a colorimetric color reproduction color profile of the target printer.

9. The print server of claim 6,
   wherein the control portion generates a color correction parameter for the nontarget printer on the basis of the target color gamut information, the predetermined printer color gamut information of the target printer, and the predetermined printer color gamut information of the nontarget printer, instructs the target printer to print the print data, and instructs the nontarget printer to print the print data on the basis of the color correction parameter.

10. The print server of claim 1,
    wherein when there is a printer not including the target color gamut among the printers selected by the selection portion, the selection portion selects a target printer having the maximum nonpermissive printer color gamut and a nontarget printer group excluding the target printer from among the plurality of printers, and the control portion generates a color correction parameter for the nontarget printer on the basis of the predetermined printer color gamut information of the target printer and the predetermined printer color gamut information of the nontarget printer, instructs the target printer to print the print data, and instructs the nontarget printer to print the print data on the basis of the color correction parameter.

11. The print server of claim 1,
    wherein when all the printers selected by the selection portion include the target color gamut, the control portion issues an instruction to print the print data on the basis of a colorimetric color reproduction color profile.

12. The print server of claim 1,
    wherein the selection portion selects the obtained number of printers having a predetermined a high-speed print information in accordance with a high-speed print mode from among the plurality of printers.

13. A print control method comprising:
acquiring target color gamut information from print data and acquiring printer color gamut information from each of a plurality of printers;
analyzing the target color gamut information and the printer color gamut information of each printer;
selecting one or more printers from among the plurality of printers on the basis of the analysis result; and
instructing the selected one or more printers to print the print data,
further comprising:
obtaining the number of printers to be used in printing from the print data, and
selecting the obtained number of printers having a predetermined printer color gamut information in accordance with a color reproduction priority mode from among the plurality of printers.

14. The print control method of claim 13,
wherein when there is a printer not including the target color gamut among the selected number of printers, a target printer having the maximum nonpermissive printer color gamut and a nontarget 5 printer group excluding the target printer are selected from among the plurality of printers, a color correction parameter for the nontarget printer is generated on the basis of the predetermined printer color gamut information of the target printer and the predetermined printer color gamut information of the nontarget printer, the target printer is instructed to print the print data, and the nontarget printer is instructed to print the print data based on the color correction parameter.

15. The print control method of claim 13,
wherein when the color reproduction priority mode is set, the obtained number of printers having the predetermined printer color gamut information which includes a target color gamut or is close to target color gamut information is selected from among the plurality of printers.

16. The print control method of claim 13,
wherein when a high-speed print mode is set as the predetermined mode, the obtained number of printers is selected in descending order of the print speed from among the plurality of printers.

17. The print control method of claim 13,
wherein the target color gamut information is compared with the predetermined printer color gamut information of each printer to detect a nonpermissive printer color gamut of each printer in a target color gamut that the target color gamut information represents, and
a target printer having the maximum nonpermissive printer color gamut and a nontarget printer group excluding the target printer are selected from among the obtained number of selected printers.

18. The print control method of claim 13,
wherein when all of the selected number of printers include the target color gamut, an instruction is issued to print the print data based on a colorimetric color reproduction color profile.

* * * * *